United States Patent
Iliev et al.

(10) Patent No.: US 10,533,882 B2
(45) Date of Patent: Jan. 14, 2020

(54) EFFICIENT BATTERY-POWERED MODULAR METER

(71) Applicant: Itron, Inc., Liberty Lake, WA (US)

(72) Inventors: George Iliev, Wissembourg (FR); Kenneth Charles Rigdon, Mapleton, MN (US); Johann de Jager, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 134 days.

(21) Appl. No.: 15/714,839

(22) Filed: Sep. 25, 2017

(65) Prior Publication Data

US 2018/0087943 A1   Mar. 29, 2018

Related U.S. Application Data

(60) Provisional application No. 62/399,799, filed on Sep. 26, 2016.

(51) Int. Cl.
*G01F 1/68* (2006.01)
*G01F 1/00* (2006.01)
(Continued)

(52) U.S. Cl.
CPC .............. *G01F 1/68* (2013.01); *G01D 4/004* (2013.01); *G01F 1/00* (2013.01); *G01F 15/046* (2013.01);
(Continued)

(58) Field of Classification Search
CPC .. G01F 1/68; G01F 1/688; G01F 1/00; G01D 4/004; H04Q 2209/60
See application file for complete search history.

(56) References Cited

U.S. PATENT DOCUMENTS

2002/0193144 A1   12/2002 Belski et al.
2009/0153357 A1   6/2009 Bushman et al.
(Continued)

FOREIGN PATENT DOCUMENTS

| EP | 2249133 | 10/2010 |
|---|---|---|
| EP | 2466277 | 6/2012 |
| WO | WO2015187182 | 12/2015 |

OTHER PUBLICATIONS

The PCT Search Report and Written OPinion dated Dec. 21, 2017 for PCT Application No. PCT/US17/53332, 14 pages.
(Continued)

*Primary Examiner* — Toan M Le
(74) *Attorney, Agent, or Firm* — Lee & Hayes, P.C.

(57) ABSTRACT

Techniques for the design and operation of an efficient battery-powered meter are described herein. A metrology unit of the meter may be at least partially located in the gas flow of a pipe, and measures gas flow rate data according to a static flow sensor. The metrology unit calculates raw gas-volume data using at least the flow rate data as input. The metrology unit measures gas temperature to produce gas temperature data, and adjusts the raw gas-volume data, based at least in part on the gas temperature data, to produce corrected gas-volume data. The metrology unit accumulates the corrected gas-volume data over multiple minutes, hours or even days, and then sends the accumulated corrected gas-volume data to an index unit of the meter. By accumulating the data over time, fewer data transmissions are required. The index unit may send the accumulated the accumulated corrected gas-volume data to a utility server.

20 Claims, 15 Drawing Sheets

(51) Int. Cl.
  *G05D 7/06* (2006.01)
  *H04Q 9/00* (2006.01)
  *G01D 4/00* (2006.01)
  *G01F 15/04* (2006.01)
  *G01F 15/06* (2006.01)
  *G01F 1/66* (2006.01)
  *G01F 15/075* (2006.01)

(52) U.S. Cl.
  CPC .............. *G01F 15/063* (2013.01); *G05D 7/06* (2013.01); *H04Q 9/00* (2013.01); *G01F 1/66* (2013.01); *G01F 15/0755* (2013.01); *H04Q 2209/40* (2013.01); *H04Q 2209/60* (2013.01); *Y02B 90/242* (2013.01); *Y04S 20/322* (2013.01)

(56) References Cited

U.S. PATENT DOCUMENTS

| | | | |
|---|---|---|---|
| 2014/0019397 A1 | 1/2014 | Alexander | |
| 2014/0366643 A1 | 12/2014 | Artiuch | |
| 2015/0153209 A1* | 6/2015 | Soreefan | G01F 1/688 73/204.23 |
| 2015/0323364 A1 | 11/2015 | Sakaguchi et al. | |
| 2018/0088599 A1 | 3/2018 | Iliev | |

OTHER PUBLICATIONS

The PCT Search Report and Written Opinion dated Dec. 22, 2017 for PCT Application No. PCT/US17/53335, 17 pages.

* cited by examiner

EFFICIENT BATTERY-POWERED MODULAR METER

RELATED APPLICATIONS

This patent application claims priority to U.S. patent application Ser. No. 62/399,799, titled "Modular, Power Efficient Battery Powered Meter", filed on Sep. 26, 2016, commonly assigned herewith, and hereby incorporated by reference.

BACKGROUND

Utilities such as gas, water and electric services that are provided to customers are typically metered at the customer's location. Power consumption by the meter is an issue in gas and water meters, because these meters are typically battery powered. Also, cost is a concern, because of the aggregate cost of the meters used by millions of customers across the country.

The power used by gas meters is typically consumed by sensor and analog functions, data processing, and data communications. Management of these power expenditures is important, due to design requirements for battery life.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for more efficiently processing metrology data in a manner that conserves battery power and network or data-bus bandwidth in a natural gas, water or other utility meter, and particularly in the functioning of a metrology unit and an index unit. In an example of the techniques, the metrology unit processes flow rate measurements to calculate a raw gas volume. The metrology unit then performs calculations using temperature data to correct the raw gas volume data and to create corrected gas volume data. Advantageously, the temperature data can be discarded (e.g., overwritten in memory) rather than transmitted to the index unit. This results in a substantial savings of battery power and data bus bandwidth. The metrology unit then accumulates corrected gas volume (or water volume) data for later transmission, which may be in response to a demand from the index unit. Also advantageously, the transmission of corrected gas volume data is not time-critical, in contrast to the transmission of flow rate data in known gas meters. Accordingly, considerable savings in power, battery life and intra-meter data transmission results.

Example Systems and Techniques

Figure 1:
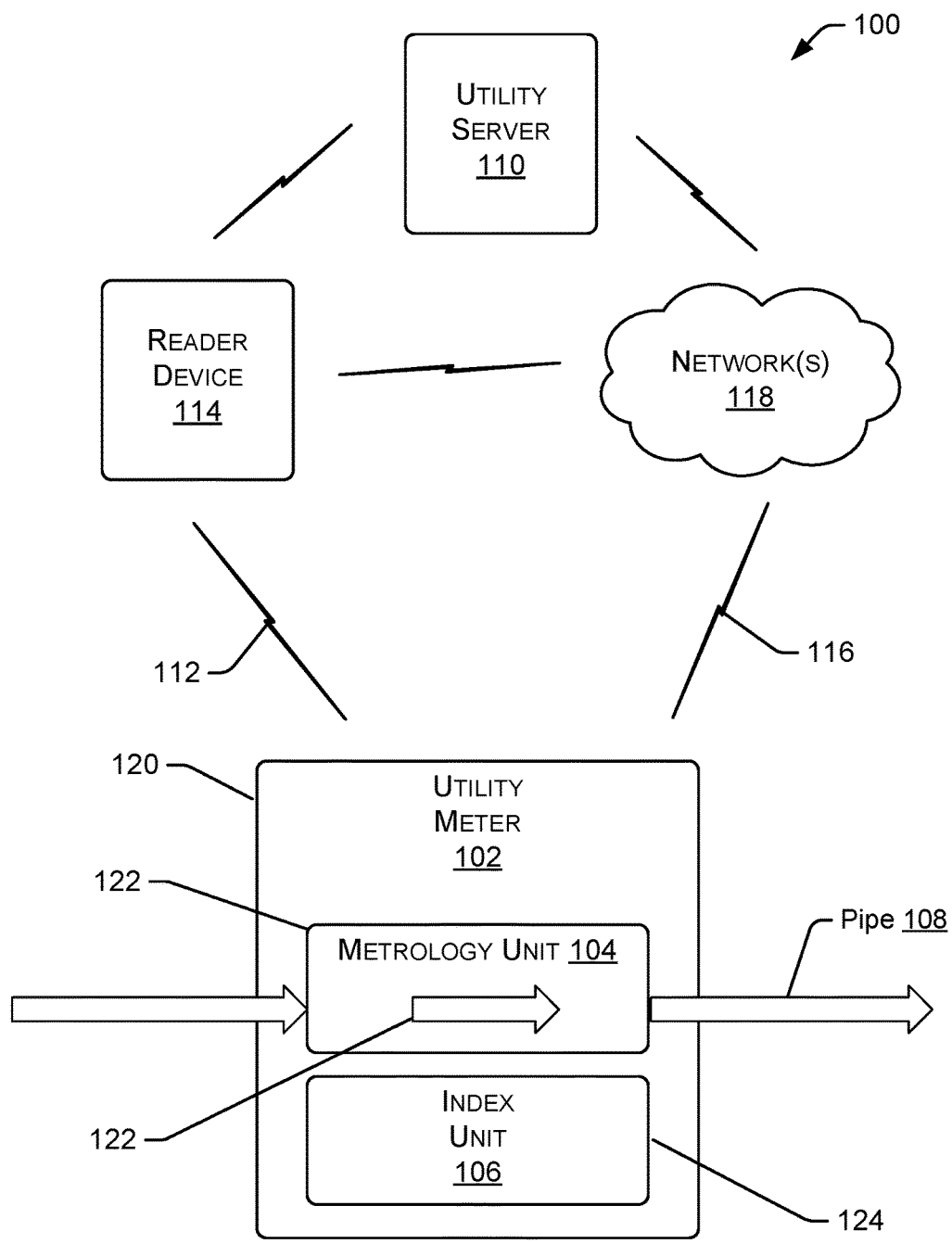
FIG. 1 is a block diagram showing an example network in which a utility meter includes a metrology unit and an index unit.

FIG. 1 shows an example system 100 in which a utility meter 102 includes a metrology unit 104 and an index unit 106. The utility meter 102 may be configured to measure gas, water or other product used by a utility customer. The metrology unit 104 may measure fluid flow through a pipe 108. The fluid may be gas or water. The metrology unit 104 may examine aspects of the fluid flow and generate data related to fluid speed, temperature, volume, vibration, or other characteristics.

The metrology unit 104 may communicate resource information to the index unit 106. In one example of the communication, the index unit 106 requests or pulls resource information from the metrology unit 104. The request may be in the form of a message, interrupt signal or other technique. In an alternative example of the communication, the metrology unit sends the resource information to the index unit according to a mutually recognized and/or understood schedule. In a further example of the communication, the metrology unit pushes the information to the index unit. The index unit 106 communicates consumption related data back to a server(s) 110 of a utility provider. In the example system 100, one or more intermediaries may be used to transmit data (e.g., consumption data) from the utility meter 102 to the utility provider 110. In one example, the index unit 106 communicates consumption related data via wireless electromagnetic signal 112 to a reader device 114. Data may be moved from the reader device 114 by cable or radio frequency (RF) connection to a utility server 110, through one or more networks 118, or other means. In another example, the utility meter 102 (e.g., by operation of the index unit 106) communicates consumption related data to a person via a display. The person then inputs the consumption related data into reader 114. In further example, the utility meter 102 and/or index unit 106 communicates consumption related data via wireless electromagnetic signal 116 to one or more devices in network 118. In this example, the device(s) in the network 118 may be one or more of another utility meter, a collection node, a cellular base station, or other communication device. The network 118 may be a compound network, such as including public, proprietary and/or utility company networks, and/or the internet, and/or other network combinations.

Using the reader device 114 and/or network 118, data (e.g., customer utility consumption data) arrives at the utility server 110 from index unit 106 of the utility meter 102. The utility provider uses the consumption related data at utility server 110 to take one or more utility-related actions such as, generating a bill, identifying usage patterns, allocating utility resources, responding to system leaks, initiating utility service turn-ons or shut-offs, or other actions.

The utility meter 102 may be include an enclosure 120. The metrology unit 104 may also have an enclosure 122, through which there is a gas flow 122 and connections to the pipe 108. The gas flow measurement process is performed by the metrology unit 104, and totalized data is reported to the index unit 106, which may be contained within an enclosure 124. The gas flow 122 is therefore contained within the enclosure 122 of the metrology unit 104, and the index unit 106 is separated from that flow.

Figure 2A:
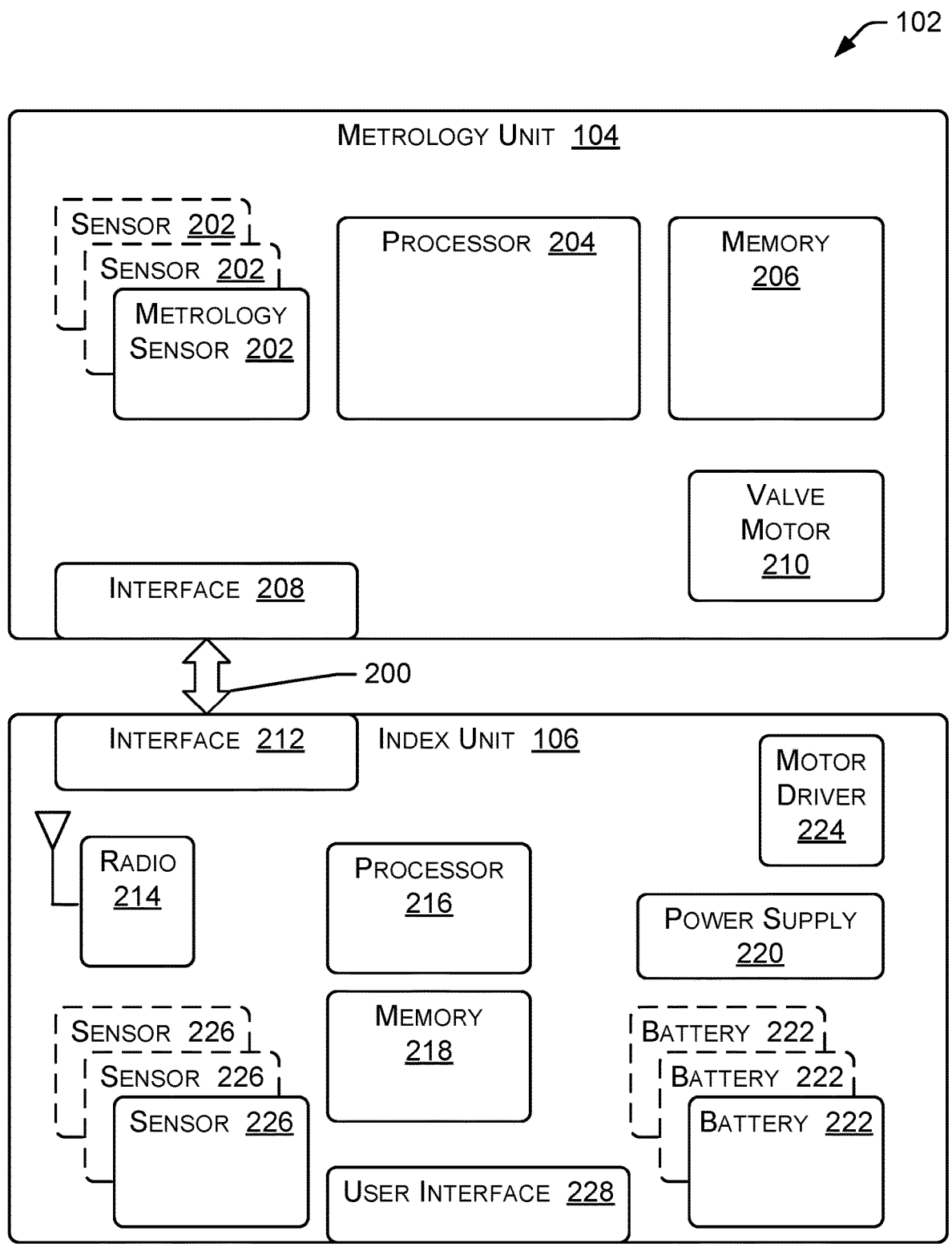
FIG. 2A is a block diagram showing a first example of components within the metrology unit and the index unit.

FIG. 2A shows an example of components of a utility meter 102 having a metrology unit 104 and an index unit 106, and thereby shows a possible implementation of the devices shown in FIG. 1. In one example, metrology unit 104 and index unit 106 are implemented as physically separate devices coupled by a link 200. One advantage of this separated implementation is that the maintenance of the combined system (e.g. meter 102) is simplified. For example, in a gas meter, with separated implementation, if the index unit 106 fails, it can be replaced without disturbing the metrology unit 104 interface with the gas pipe. Similarly, if communication conditions between the index unit 106 and network 118 or reader 114 are difficult, the location of the index unit can be moved without disturbing the metrology unit 104 and/or its interface to the gas pipe. Separate implementation of the metrology unit 104 and index unit 106 also facilitates flexibility and simplicity in designing metering systems that use different measurement techniques. In the example of a gas meter, a single index unit 106 can be alternatively paired with metrology units using different technologies, such as mechanical fluid measurement techniques, ultrasonic fluid measurement techniques, thermal mass flow measurement, or other measurement techniques. This allows a single index unit 106 to be used in systems utilizing different metrology technologies, which results in manufacture and supply efficiencies.

Metrology unit 104 includes one or more sensors 202. In one example, a plurality of sensors 202 may be present in the metrology unit 104. In the example, a metrology sensor 202 may include one or more of an ultrasonic sensor, a temperature sensor, a tilt sensor, a thermal mass flow sensor, and/or other sensor(s). Other sensors may be related to temperature, tilt (e.g., tilting of the unit 104, indicating possible tampering) and other factors. The sensors 202 are coupled to processor 204. In one example, the processor 204 is an ASIC, FPGA, general purpose microprocessor, microcontroller, system or PC on a chip/card, or other processing mechanism. While shown as a single block, processor 204 may be implemented as one or more separate devices. In one example, the sensors 202 pass sensor readings to the processor 204. Processor 204 is coupled to memory 206. While shown as separate blocks, processor 204 and memory 206 may be implemented as a single device or as multiple devices. Processor 204 sends sensor readings obtained from sensors 202 to the memory 206 for storage. In one example, processor 204 performs one or more operations on the sensor readings such as accumulation, measurement refinement and/or improvement, temperature data acquisition, utilization and/or storage, or other calculations. Processor 204 may also utilize appropriate drivers and hardware devices to communicate with the index unit 106.

Processor 204 is coupled to interface 208. In one example, interface 208 is a multi-pin connector, which may be support by one or more integrated circuits, as required by a particular design. In an example, two or more pins of interface 208 provide connections for power, return and/or ground from link 200, to thereby provide power and ground for one or more components in the metrology unit 104. For example, a first set of pins in interface 208 provides a first ground and power (e.g., 3 volts) for processor 204. A second set of pins may provide power (e.g., 12 volts) and ground for valve motor 210. In another example, one or more pins of interface 208 are used for communications between metrology unit 104 and index unit 106. The communications may be serial, parallel, proprietary and/or according to a standard. In one example, communications between the metrology unit 104 and index unit 106 are performed over a serial link through interface 208, cable 200 and interface 212. The components of the metrology unit 104 may receive power, ground and communication lines that are routed directly or indirectly (e.g., through other components) from interface 208. The metrology unit 104 may utilize data and/or power busses or printed circuit wiring, which may be connected to the interface 208, to provide power and data connectivity to some or all devices.

In one example, metrology unit 104 includes valve motor 210. Valve motor 210 operates to open or close a valve, and to thereby provide full or partial control over the volume or rate of flow of a material, such as gas or water, through a pipe to which the metrology unit 104 is attached. The valve motor 210 may be coupled to processor 204, a power and/or data bus, or directly to interface 208. Alternatively or additionally, the valve motor 210 may be attached to the motor driver 224 over the interface and link 200. Accordingly, the motor driver 224 and/or the processor 204 may provide control signals and/or power to the valve motor 210 to facilitate opening or closing a valve in the pipe (e.g., pipe 108 of FIG. 1).

Metrology unit 104 is coupled to index unit 106, such as via wired, optical and/or RF connection 200. In one example, connection 200 is a multi-wire connector, cable and/or conductor that provides power and communication connections and throughput. In the example shown, connection 200 is coupled by wiring or cable, between interface 208 of the metrology unit 104 and the interface 212 of index unit 106. In an implementation having a wired connection, the metrology unit 104 may receive power from the index unit 106.

Index unit 106 may include a radio 214. In one example, radio 214 includes a power amplifier, transmitter, receiver, filters, switches, and other circuitry to support wireless RF communication. The radio 214 is coupled to one or more antennas to transmit and/or receive wireless signals. In one example, the signals are sent to or from the reader 114 or device(s) in network 118 (both shown in FIG. 1). While shown as within index unit 106, the antenna may be housed within, partially within, or outside of the index unit. The radio 214 may be coupled to processor 216. In one example, processor 216 is similar to processor 204 and is implemented as one or more ASICs, FPGAs, microprocessors or other processing mechanisms. Processor 216 is coupled to memory 218, such as by a data bus connecting some or all of the devices of the index unit 106. While shown as separate blocks, processor 216 and memory 218 may be implemented as a single device or multiple devices.

Processor 216 may be coupled to interface 212, either by direct wiring, printed circuit board, or one or more data and/or address busses. In one example, interface 212 is similar to interface 208 of metrology unit 104 and enables the supply of power to the metrology unit 104 from the index unit 106 and the exchange of communication between the two units. In one example, processor 216 receives metrology information from metrology unit 104 via the connector 200 and the interface 212. The processor 216 stores the metrology information in the memory 218. In one example, the processor 216 performs one or more operations on the metrology information such as accumulation or mathematical calculations and stores the result in the memory 218. In one example, the processor 216 sends the metrology information to reader device 114 or devices in network 118 (both shown in FIG. 1) via the radio 214 and associated antenna.

Index unit 106 includes a power supply 220 coupled to a battery 222. The battery 222 may include one or more cells and/or batteries. The power supply 220 draws power from the battery 222 and supplies voltage-regulated power to one or more elements of index unit 106 or metrology unit 104. In one example, the power supply 220 provides power at a first voltage and/or current level to elements such as processor 216 and processor 204 and power at a different voltage level to motor driver 224 and a power amplifier within radio 214. Accordingly, the power supply 220 provides consistent and/or desired voltage levels at different output current levels and/or different battery voltages (e.g., as the battery discharges). The power supply 220 may be coupled to processor 216, memory 218, radio 214, motor driver 224 and other components of the index unit 106 through direct connections or use of a power bus of the index unit. The power supply 220 may also supply power to elements of metrology unit 104 through interface 212, connector 200 and interface 208.

In one example, index unit 106 includes a motor driver 224. The motor driver 224 may be coupled to data and power buses, or directly to the processor 216. The motor driver 224 may also, or in the alternative, be coupled to valve motor 210 through interface 212, connector 200, and interface 208. In one example, motor driver 224 supplies one or more signals and/or power levels to valve motor 210 to cause the valve motor to open or close a valve, and turn on or shut off the flow of fluid through a pipe to which the metrology unit 104 is attached.

In one example, index unit 106 includes one or more sensors 226 coupled to processor 216. In one example, sensors 226 may include a tilt sensor, a vibration sensor, a leak detector, and/or other sensors. In one example, information from a sensor 226 is used by processor 216 in performing calculations on data received from metrology unit 104. In another example, information from sensor 226 is communicated by processor 216 to the utility provider 110 (of FIG. 1) for use in decisions to turn on or shut off utility service to a customer.

A user interface 228 may include a screen to display information. In an example, a worker may press a button and view data displayed responsive to activation of the button. The viewed data may be keyed into the reader device 114 of FIG. 1, for transmission to the utility server 110.

The arrangement of elements seen in FIG. 2A is one example of component selection and arrangement. In another example, the components used in the metrology unit 104 and/or the index unit 106 may be replaced with different component(s). Additionally, components, their equivalent, and/or their replacement, may be transferred between the metrology unit 104 and the index unit 106. For example, the motor driver 224, the sensor 226, the power supply 220, and the battery 222 may be moved, removed, duplicated and/or rearranged between the metrology unit 104 and index unit 106.

Figure 2B:
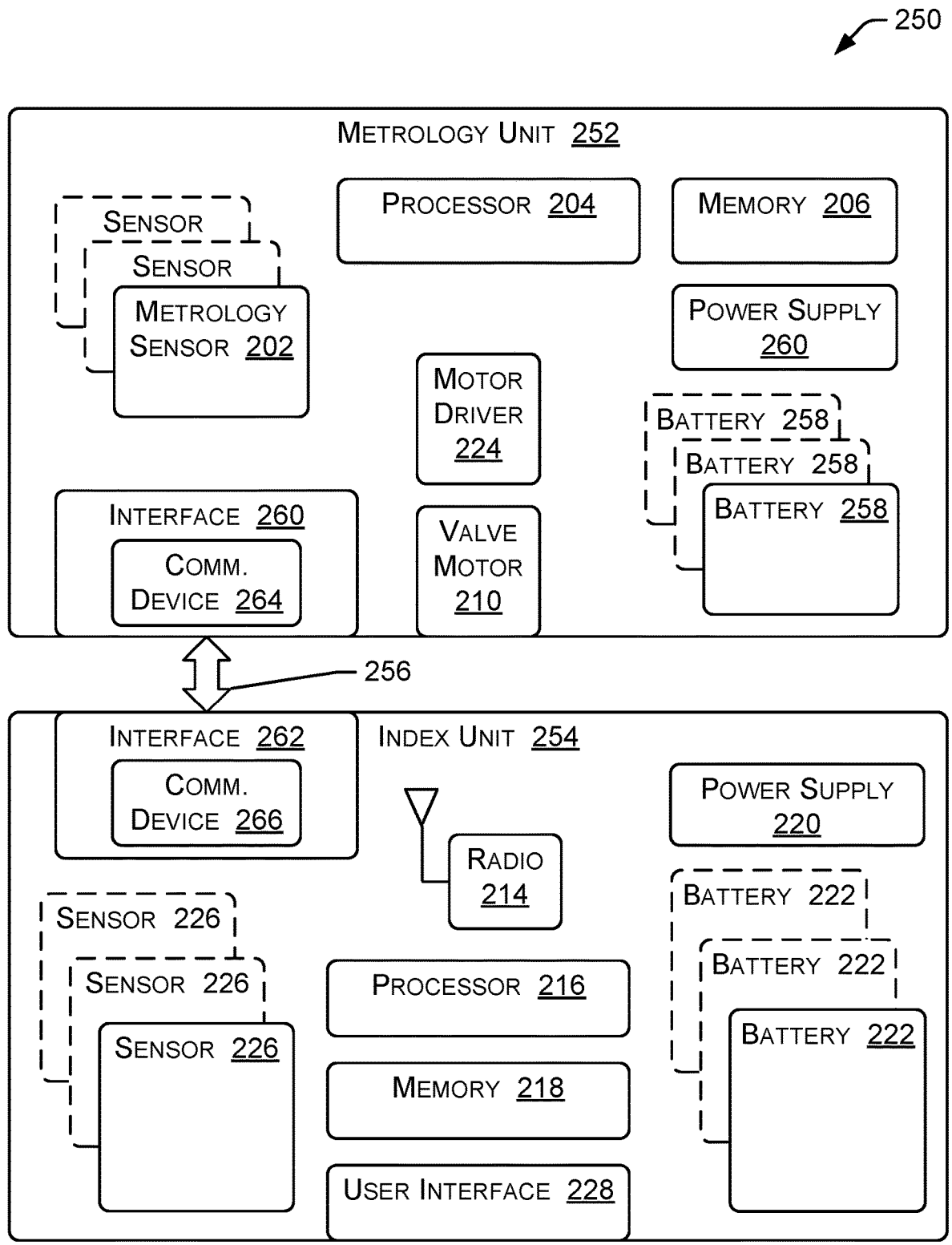
FIG. 2B is a block diagram showing a second example of components with the metrology unit and the index unit.

FIG. 2B shows an example of components of a utility meter 250 having a metrology unit 104 and an index unit 106, and thereby shows a possible implementation of the devices shown in FIG. 1. In the example shown, the utility meter 250 is similar to the meter 102 shown in FIGS. 1 and 2. However, the meter 250 is powered by internal batteries 258. Accordingly, the metrology unit 252 is able to totalize gas consumption data without power provided by the index unit 254. Moreover, the metrology unit 252 may be configured to calculate a gas volume that is accurate to within a threshold value or threshold error, without the assistance or intervention by the index unit 254. The threshold value or allowed error may be based on legal and/or business requirements, such as a particular fraction of a percent of inaccuracy.

Advantageously, the metrology unit 252 is a stand-alone unit. Accordingly, the index unit 254 may be replaced with a different unit of the same of different design without resulting in a need for re-design, re-calibration and/or re-certification (e.g., by governmental agency) of the metrology unit 252. This allows the index unit to be replaced for much less cost than is the case wherein the metrology unit and the index unit share components, software, power and/or roles in the calculation of gas volume data and/or totalized gas consumption data. Such replacement does not result in need to re-design, re-calibration and/or recertify the metrology unit.

Metrology unit 252 includes one or more batteries 258, which may power various components, including one or more sensors 202, the processor 204, memory 206, motor driver 224, valve motor 210, communications device 264 and/or other components. In the example shown, the batteries 258 provide power to components through a power supply 260, which provides regulated voltages at desired current levels. Accordingly, as the battery discharges, regulated power is provided to the components of the metrology unit 252.

An interface 260, 262 between the metrology unit 252 and the index unit 254 may be wired or wireless. In the utility meter 250 of FIG. 2B, a wireless interface may be used, in part because both units are powered by their respective batteries, and wiring to provide power between units is not required. The interface 260, 262 may include communications devices 264, 266, which may be based on optical, radio frequency, magnetic or other technologies.

Figure 3A:
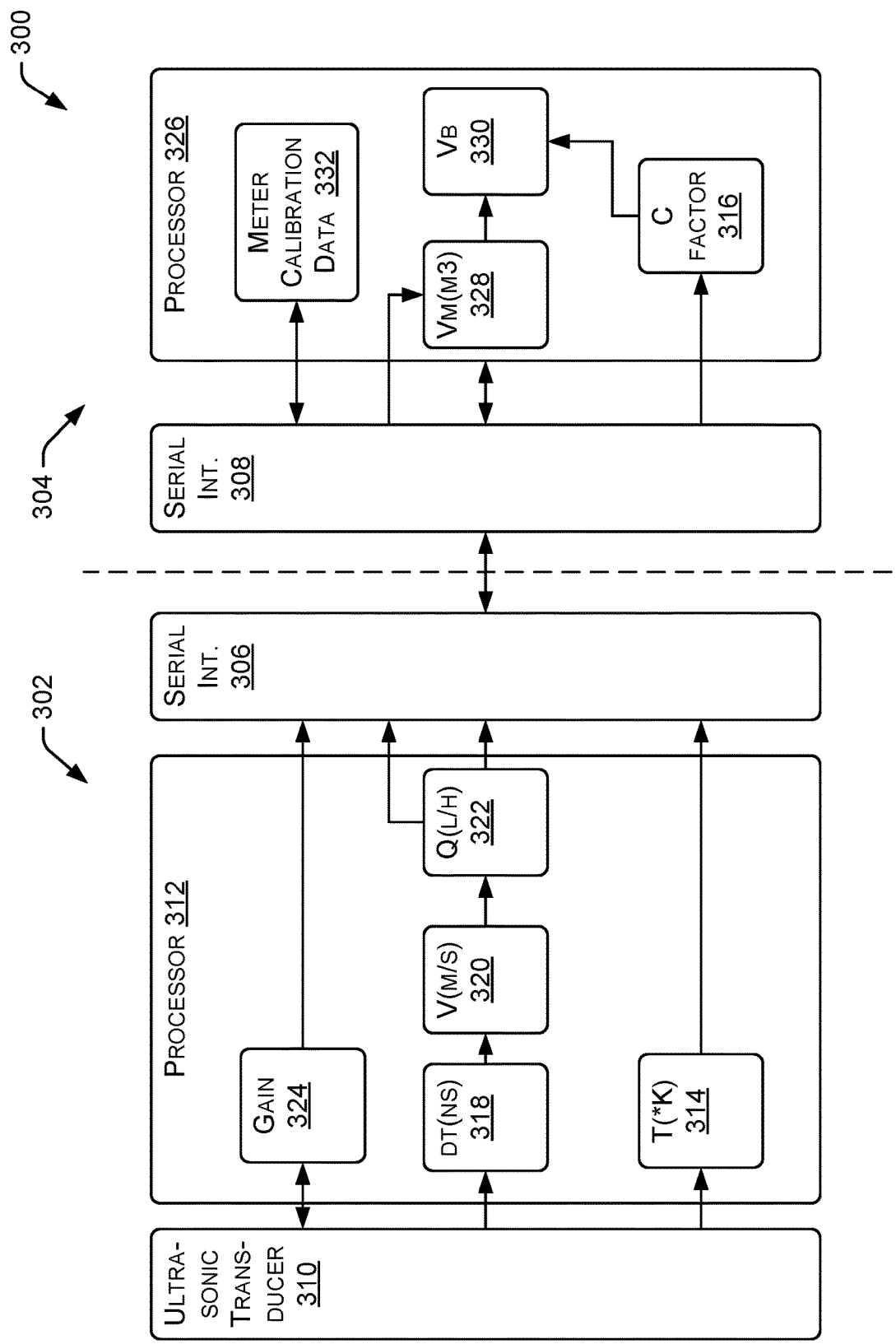
FIG. 3A is a block diagram showing an example operational sequence of processing within a utility meter, and showing a first division of functionality between the metrology unit and the index unit.
Figure 3B:
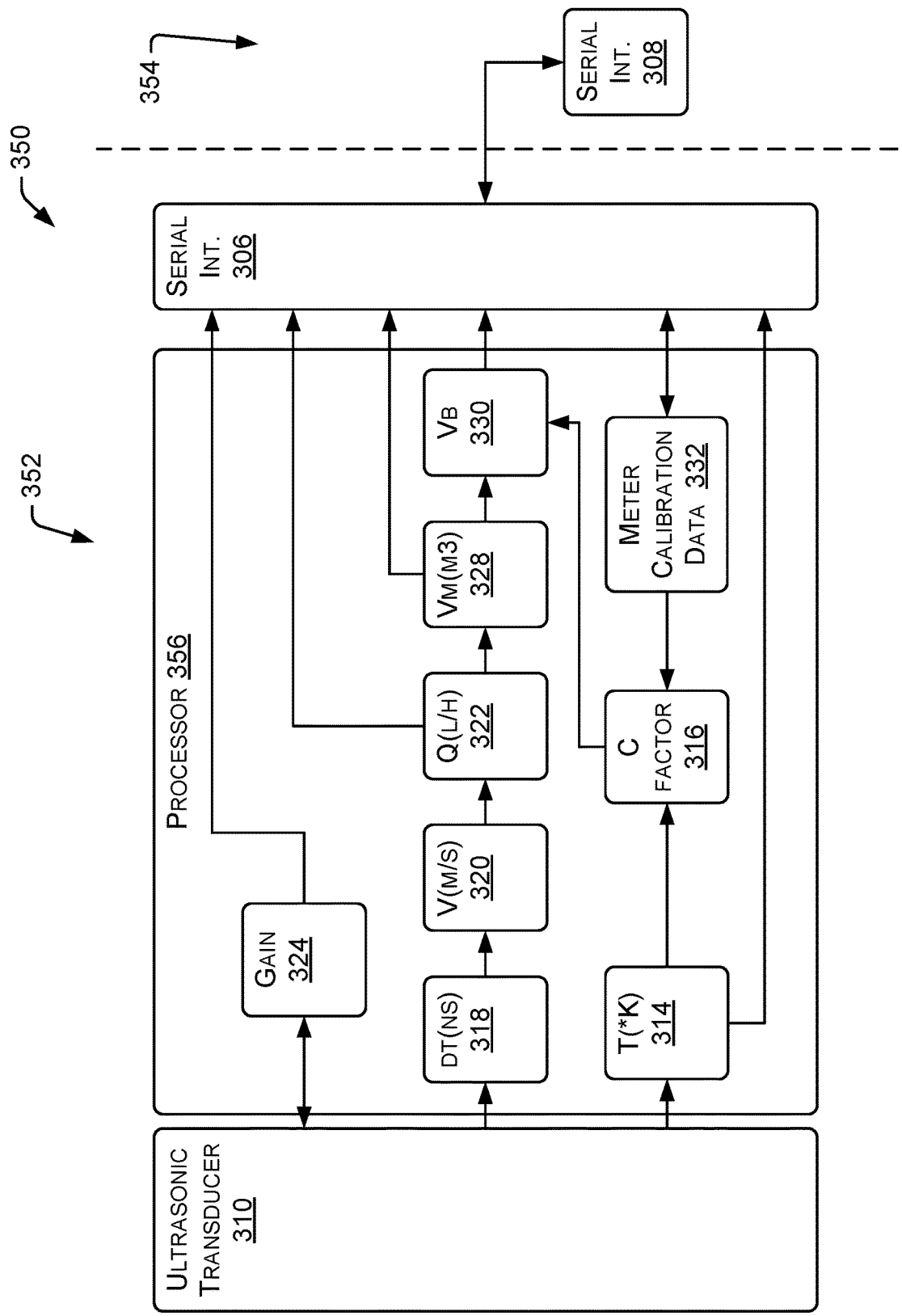
FIG. 3B is a block diagram showing an example operational sequence of processing within a utility meter, and showing a second division of functionality between the metrology unit and the index unit.

FIGS. 3A and 3B show additional example configurations of utility meters 300 and 350, respectively. Each meter is configured with a metrology unit and an index unit. However, the location and/or design of several functional blocks distinguish the two examples.

FIG. 3A is a block diagram showing an example sequence of processing within a utility meter 300, and showing a first division of functionality between a metrology unit 302 and an index unit 304. In the example, an interface 306 the metrology unit 302 communicates with an interface 308 of the index unit 304. While the interface 306, 308 is shown as a wired serial interface, parallel interfaces, radio frequency, magnetic, optical and other technologies could be substituted. A pair of ultrasonic transducers 310 is representative of gas-flow sensing devices. The ultrasonic transducers 310 provide one or more output signals to a processor 312. In the example shown, ultrasonic transducers are defined at least in part in hardware. In a possible configuration, the ultrasonic transducers send one or more acoustic waves in opposite directions, and measure a differential time of transmission of the two waves to produce a gas velocity signal. The ultrasonic transducers 310 or a different device may measure the gas temperature, which is provided to the processor 312. A T (temperature) functional block 314 may be defined within the processor, and may be configured to receive temperature data as input. The T block 314 may be configured to condition the received temperature signal for transmission to the serial interface, such as for further use, such as for meter calibration. The temperature information processed at block T 314 may sent to the processor 326 for use by a C factor block 316 (i.e., temperature compensation factor block). While the T block 314 is shown in the metrology unit 302 and is operated by the processor 312, the raw temperature data could be passed through to the index unit 304 of the meter 300, and the T block could be located in the index unit 304 and could be executed by the processor 326. The C factor block 316 uses the temperature information to produce data usable to refine the calculated gas volume measurements according to gas temperature and the base temperature. A dt block 318 processes signal timing measurement information, which may be in the nanosecond range (or other range, as indicated by design requirements). The dt block may process a difference in time measurement of an ultrasonic signal sent upstream and an ultrasonic signal sent downstream. Such signals may be considered to be time upstream (T-up) and time downstream (T-down). Such signals may be incrementally (i.e., very slightly) different, as a result of the gas movement (flow) as the signals move through the gas stream. The difference may be used to assist in the calculation of the gas flow velocity. The differential time signals may be sent to the V(m/s) block 320, where the velocity of the gas stream (e.g., in meters per second) is calculated. The velocity may be calculated in part by consideration of ultrasonic signal path length, angle of signal transmission and other factors. At a Q(l/h) block 322, a cross-section of the gas flow is determined and/or applied. The length/height notation may also represent more complex calculations of the cross-section. Accordingly, the blocks 320 and 322 calculate information from which it is possible to derive gas flow according to velocity and a cross-section through which the gas moves. The gain block 324 is used as a control on signal strength and amplitude, and helps to compensate for gas temperature, gas pressure, gas composition and other factors. The gain block 324 may be configured to receive and transmit information, so that the gain may be determined based on input received from the ultrasonic transducer. Also, the gain block 324 may be configured to receive information so that a desired level of gain (e.g., signal amplitude) may be set, and a data frame configured for transmission to the indexing unit 304 of the meter 300. The gain level may also be used to determine transducer functionality. For example, a high gain level and/or saturation in combination with a low signal level and/or erroneous data may indicate that the transducer 310 is near its end-of-life. In another example, if the gain is above a threshold value, a failure of the ultrasonic transducer may be assumed. Data representing a volume of the gas flowing over time may be accumulated over time in an accumulator. In the example shown, the Vm(m3) 328 block is located in the processor 326 accumulates volume of gas (e.g., in meters squared) as it is measured over time. The volume calculated at Vm(m3) block 328 may be considered to be raw volume data, which is adjusted for temperature at Vb block 330. Output of the C factor block 316 may be used as input by Vb block 330 to calculate a temperature-adjusted gas volume.

FIG. 3B is a block diagram showing an example sequence of processing within a utility meter 350, and showing a second division of functionality between the metrology unit 352 and the index unit 354. In the example, a processor 356 is configured to receive gain, gas flow and gas temperature data from the ultrasonic transducer 310. In the processor 356, the gain block 324, dt block 318, V(m/s) block 320, Q(l,h) block 322, T block 314 and C factor block 316 are similar to the arrangement seen in FIG. 3A. However, the Vm(m3) block 328, the Vb block 330 and the meter calibration data block 332 are configured for operation by the processor 356 of the metrology unit 352.

Example Message Transmission

FIGS. 4-17 are flow diagrams showing an example processes 400-1700 which are representative of techniques for use in utility meters and other devices having internal communications. The processes may, but need not necessarily, be implemented in whole or in part by the system 100 and/or the meters of FIGS. 1 through 3. In some examples of the techniques discusses herein, the methods of operation may be performed by one or more application specific integrated circuits (ASIC) or may be performed by a general-purpose processor utilizing software defined in computer readable media. In the examples and techniques discussed herein, the memory 206, 218 may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

FIGS. 4 through 9 are flow diagrams showing operation of an example metrology unit, such as metrology unit 104 of FIGS. 1 and 2. However, similar actions may alternatively be performed by a similar or alternative metrology unit.

Figure 4:
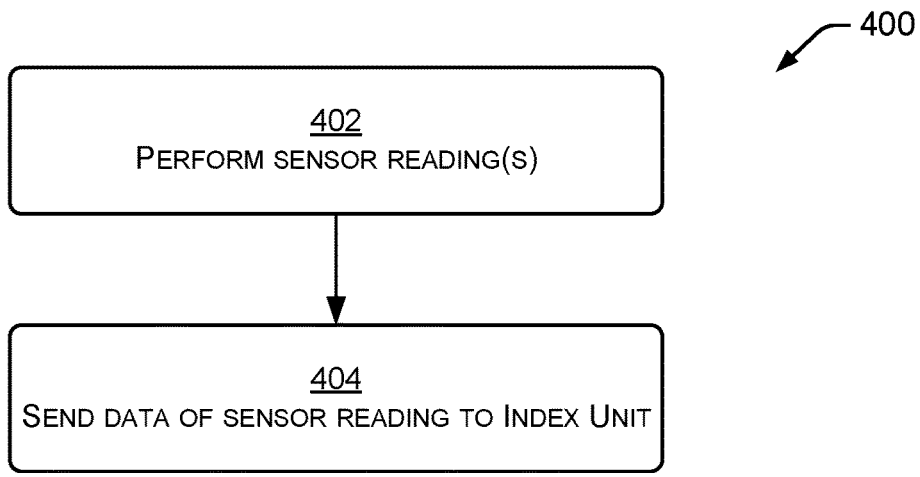
FIG. 4 is a flow diagram showing operation of an example metrology unit.

FIG. 4 shows example operation 400 of a metrology unit, wherein data from sensor readings are sent to an index unit. At block 402, metrology unit 104 performs a sensor reading. In one example, the sensor reading is a propagation time measurement, which may be performed by a pair of ultrasonic sensors. At block 404, the metrology unit 104 sends the sensor reading to the index unit 106. In one example, the metrology 104 unit performs the sensor reading multiple times to ensure an accurate measure of the amount of a resource consumed. For example, with flow rate measurements, the measured flow rate can be converted to a volume measurement. If the flow rate measurements are taken close together, the derived volume from each flow rate measurement is an accurate approximation of the actual volume of resource (e.g., fluid, gas, water) consumed since the last measurement. However, if the flow rate measurements are taken farther apart it is possible that the flow rate will have changed significantly between measurements, and the volume calculation from a flow measurement will not accurately approximate the volume of resource consumed since the last flow measurement. In one example, to obtain sufficient accuracy, the metrology unit 104 performs an ultrasonic sensor reading of flow rate approximately every one or two seconds. The reading is then sent by the metrology unit 104 to the index unit 106. In one example, the reading is pulled by the index unit 106 as needed or to fit a schedule, etc. In the example, the index unit 106 may send a demand to the metrology unit 104, and receive data in response to the demand.

Figure 5:
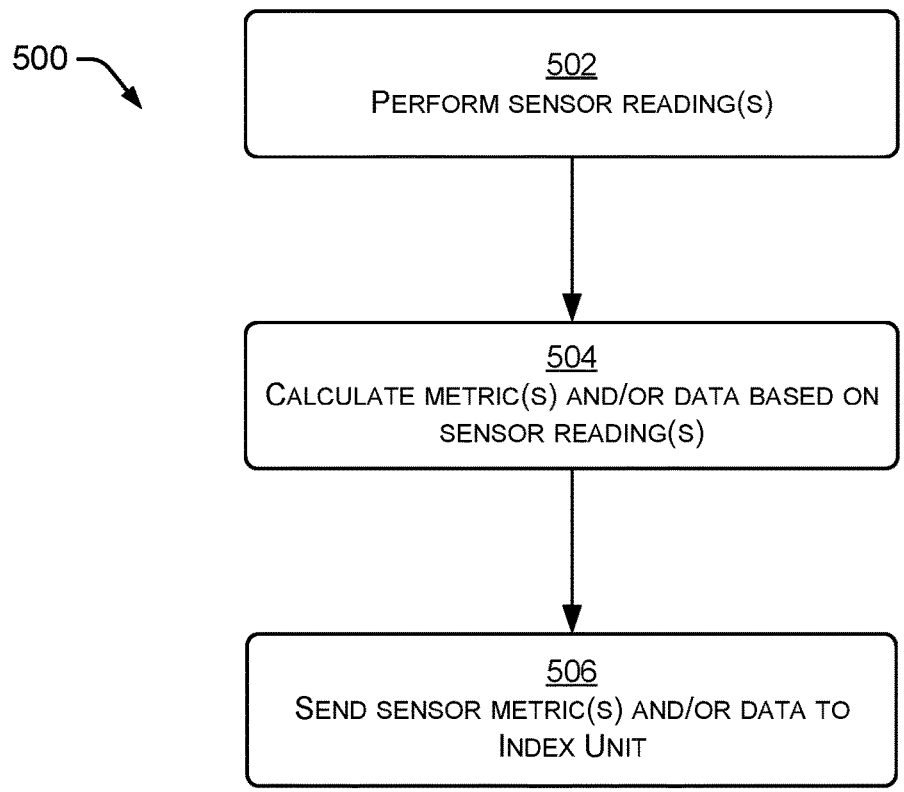
FIG. 5 is a flow diagram showing operation of an example metrology unit.

FIG. 5 shows example operation 500 of a metrology unit, wherein data from sensor measurements are used in calculations, and the calculated data is sent (e.g., in response to a demand, in a pull process) to an index unit. At block 502, a metrology unit 104 performs a sensor reading. Block 502 may be performed in a similar manner to a corresponding block in the previous figure. At block 504, the metrology unit 104 calculates a metric based on the sensor reading. In one example, the sensor reading is an ultrasonic sensor reading of flow rate. In this example, the metrology unit 104 converts the flow rate into a volume metric. In another example, the metrology unit 104 performs both a volume calculation and a temperature compensation calculation on the sensor reading to generate a temperature-compensated volume metric. At block 506, the metrology unit 104 sends (e.g., in response to a demand from the index unit, in a "pull" process) the metric to the index unit 106.

In some circumstances, it is beneficial to reduce the number of communications between the metrology unit 104 and the index unit 106. The amount of power used to communicate sensor readings or metrics from the metrology unit 104 to the index unit 106 represents a significant portion of the battery power energy used by the entire system. Thus, the reduction in the power for communications between these units results in additional battery life, reduction in the size or number of batteries, or additional power available for other purposes.

Figure 6:
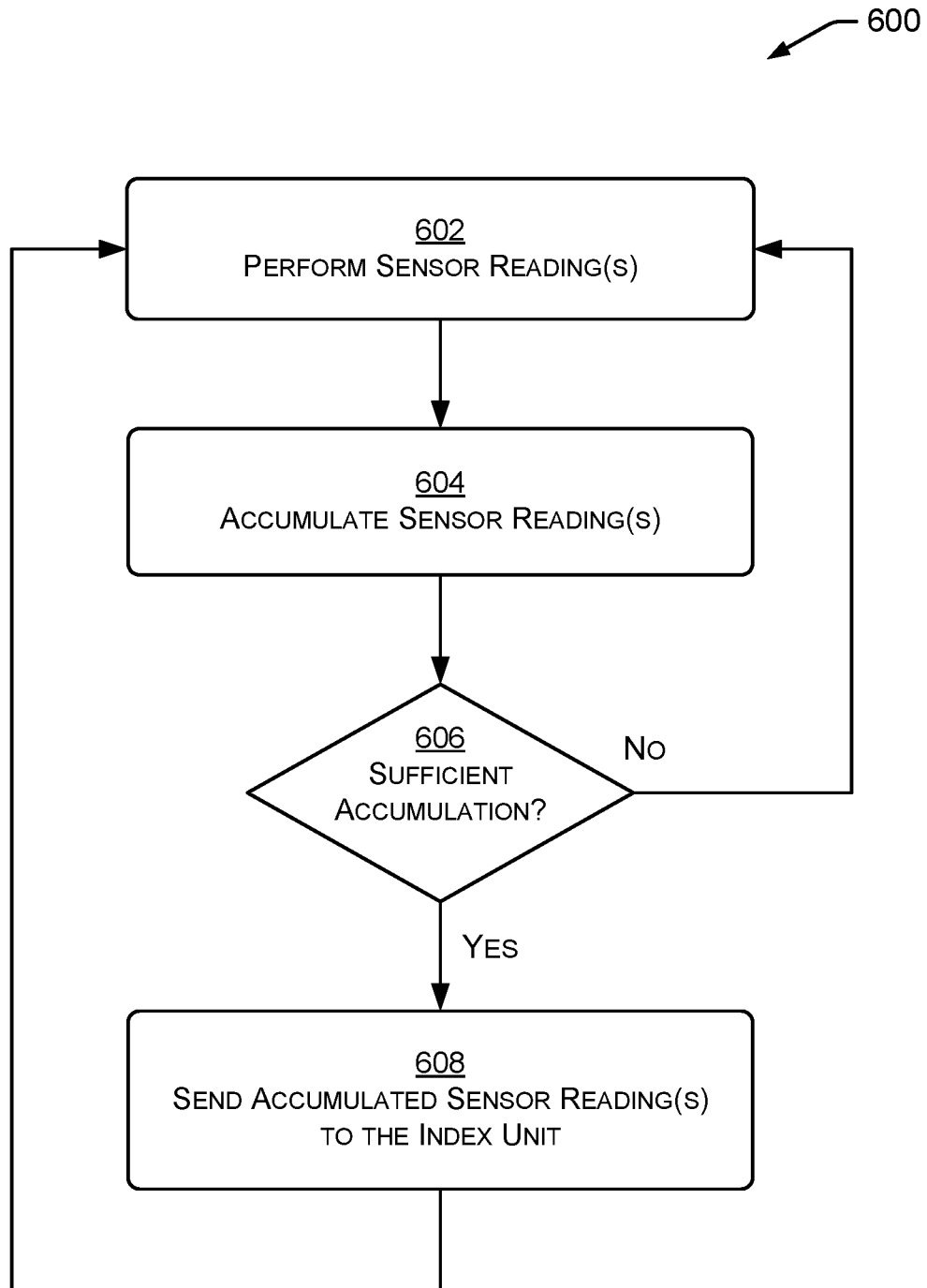
FIG. 6 is a flow diagram showing operation of an example metrology unit.

FIG. 6 shows example operation 600 of a metrology unit, wherein data accumulation is performed, thereby allowing less frequent data transmissions and correspondingly increased power savings. While the blocks are shown in a sequence, techniques described in two or more blocks could be performed simultaneously. At block 602, a metrology unit 104 performs a sensor reading. In one example, an ultrasonic sensor provides a propagation time measurement, from which flow rate may be calculated. In an example, the calculations are performed at the metrology unit. At block 604, the metrology unit 104 accumulates the sensor reading.

In one example the processor 204 takes the current reading and adds it to an accumulated value in memory 206. At decision block 606, the metrology unit 104 determines if there has been a sufficient, desired and/or threshold amount of accumulation of accumulated sensor readings and/or other data. In an example, the accumulation is considered to be sufficient if the index unit has requested data from the metrology unit. The request may be part of a "pull" process, by which data is pulled from the metrology unit by the index unit, or the request may be part of a "push" process, by which data is sent by the metrology unit without a corresponding data request. In one example, the metrology unit 104 determines completeness of the accumulation by using a counter to track a number of accumulations to perform, or a period of time during which to accumulate. In another example, the metrology unit 104 performs accumulations in an on-going manner. At intervals, the metrology unit 104 may receive a notification, request, demand and/or interrupt from the index unit 106. In the event of such a demand from the index unit 106, the metrology unit proceeds to block 608. At block 608, the metrology unit 104 sends the accumulated sensor reading to the index unit 106. If the metrology unit detects no demand from the index unit, the sensor and accumulation functions continue at block 602. Advantageously, by accumulating the sensor readings at the metrology unit 104 the number of communications between metrology unit 104 and the index unit 106 can be significantly decreased without sacrificing the accuracy of the metering function. In one example, rather than communicating a sensor reading from the metrology unit 104 every one or two seconds responsive to, or in synchronization with, the taking of the sensor readings, the metrology unit 104 can send accumulated sensor readings, e.g., responsive to a demand from the index unit 106, every minute, every hour, every 12 hours, or even longer. Advantageously, the transmissions of accumulated data are not time-critical. Accordingly, other time-critical events may be performed, and the reporting of accumulated data delayed or otherwise adjusted. The battery savings of the accumulation, and associated reduction in transmissions, are significant.

Figure 7:
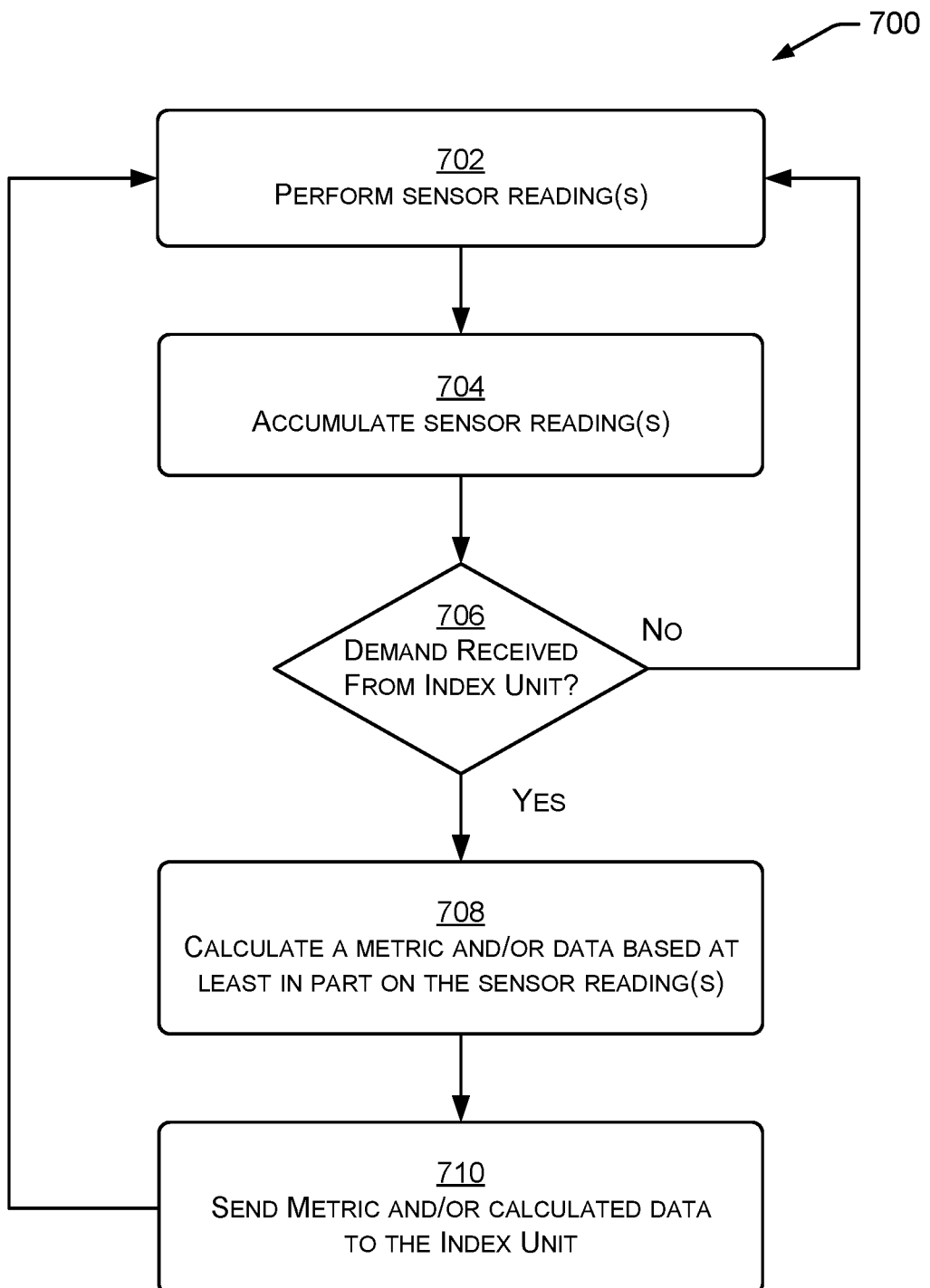
FIG. 7 is a flow diagram showing operation of an example metrology unit.

FIG. 7 shows example operation 700 of a metrology unit, wherein data accumulation and calculations are performed, thereby allowing less frequent data transmissions and correspondingly increased power savings. At block 702, the metrology unit 104 performs a sensor reading. At block 704, the metrology unit 104 accumulates the sensor reading. At decision block 706, the metrology unit 104 determines if a request, demand or interrupt has been received from the index unit, requesting data. At block 708, if a request was received, the metrology unit 104 calculates a metric based on the accumulated sensor readings. At block 710, the metrology unit 104 sends the metric, calculated data, and/or the accumulated data to the index unit 106, in response to the request at block 706. If no request or demand was received at block 706, sensor readings and accumulation continue, at blocks 702 and 704

Figure 8:
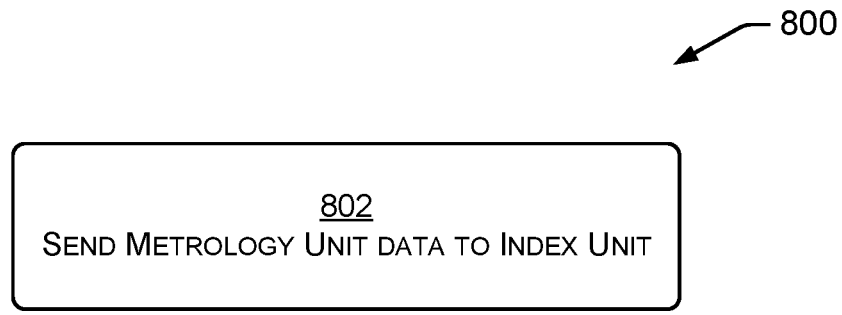
FIG. 8 is a flow diagram showing operation of an example metrology unit.

FIG. 8 shows example operation 800 of a metrology unit, which in some configurations may be a slave with respect to the index unit. The relationship may utilize techniques wherein the index unit "pulls" data from the metrology unit, such as by sending the metrology unit a demand for data. Responsive to the demand from the index unit, the metrology unit sends metrology data to the index unit. At block 802, metrology unit 104 sends metrology unit data to the index unit 106. In one example, memory 206 includes one or more non-volatile memory devices. In this example, the non-volatile memory stores one or more of calibration data from the sensor 202, identification information for the metrology unit 104, or other information. Advantageously, calibration or identification information stored on the metrology unit 104 can increase the modularity of the entire system. For example, if calibration information is stored on the metrology unit 104 rather than on the index unit 106, the metrology unit 104 can be calibrated separately from the index unit 106. Further, the index unit 106 can be replaced easily without disturbing the metrology unit 104. In one example, data from the metrology unit is sent as a distinct message. In another example, data from the metrology unit may be sent as part of another message such as the messages sent in steps blocks 404, 506, 608, or 710 of FIGS. 4, 5, 6 and 7, respectively.

Figure 9:
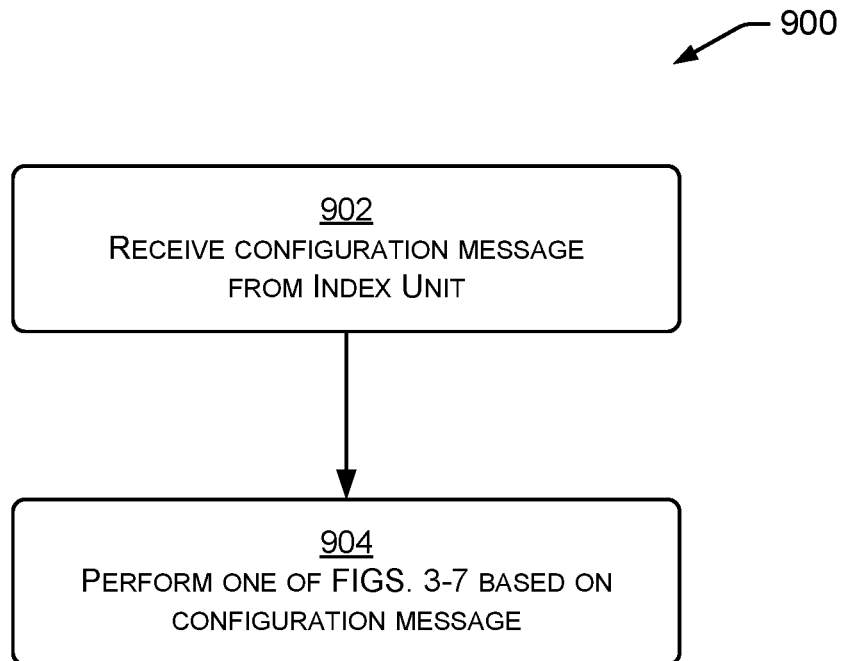
FIG. 9 is a flow diagram showing operation of an example metrology unit.

FIG. 9 shows example operation 900 of a metrology unit, wherein the metrology unit receives a configuration message, and subsequently sends data according to configuration instructions received in the message. At block 902, the metrology unit 104 receives a configuration message from the index unit 106. In one example, the configuration message is received in combination with an acknowledgement of a previous transmission to the index unit 106. In one example, the configuration message contains a mode select indicator instructing the metrology unit 104 to operate in a particular mode. In one example, the possible modes correspond to one or more of the processes described with respect to flowcharts 400-800 of FIGS. 4 through 8. In another example, the mode indicator instructs the metrology unit to select between an accumulation mode, such as the processes 600 and 700 of FIGS. 6 and 7, and a discrete mode, such as the processes of flow charts 800 and 900 of FIGS. 8 and 9, respectively. In another example, the configuration message indicates what metrology unit data, if any, should be included in a subsequent message from the metrology unit 104 to the index unit 106. At block 904, the metrology unit 104 performs one of the processes 400 through 800 described with respect to FIGS. 4 through 8 responsive to the configuration message. In one example, the metrology unit 104 repeats the selected process until a new or different configuration message is received.

Figure 10:
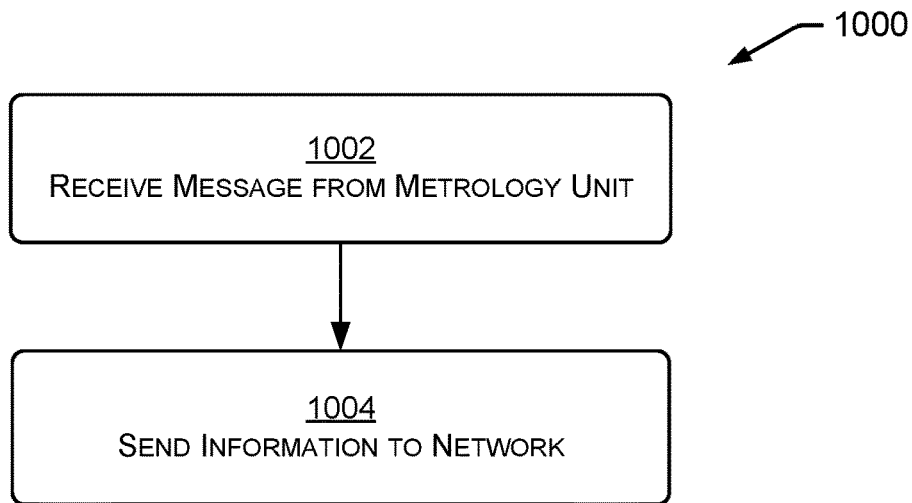
FIG. 10 is a flow diagram showing operation of an example index unit.

FIGS. 10 through 13 are flow diagrams showing example operation of an index unit (e.g., index unit 106 of FIGS. 1 and 2). FIG. 10 shows example operation 1000 of an index unit 106, wherein the index unit receives a message from the metrology unit and sends or forwards the information over a network. At block 1002, the index unit 106 receives a message from metrology unit 104. In one example, the message contains one or more of sensor readings, accumulated sensor readings, calculated metrics from a single sensor reading, calculated metrics from accumulated sensor readings, metrology data, or other information. At block 1004, the index unit 106 sends some or all of the information from the received message over the network 118 or to the reader 114. In one example, the transmission of the information may be delayed based on a schedule of the index unit 106 for reporting information over the network 118 or to the reader 114.

Figure 11:
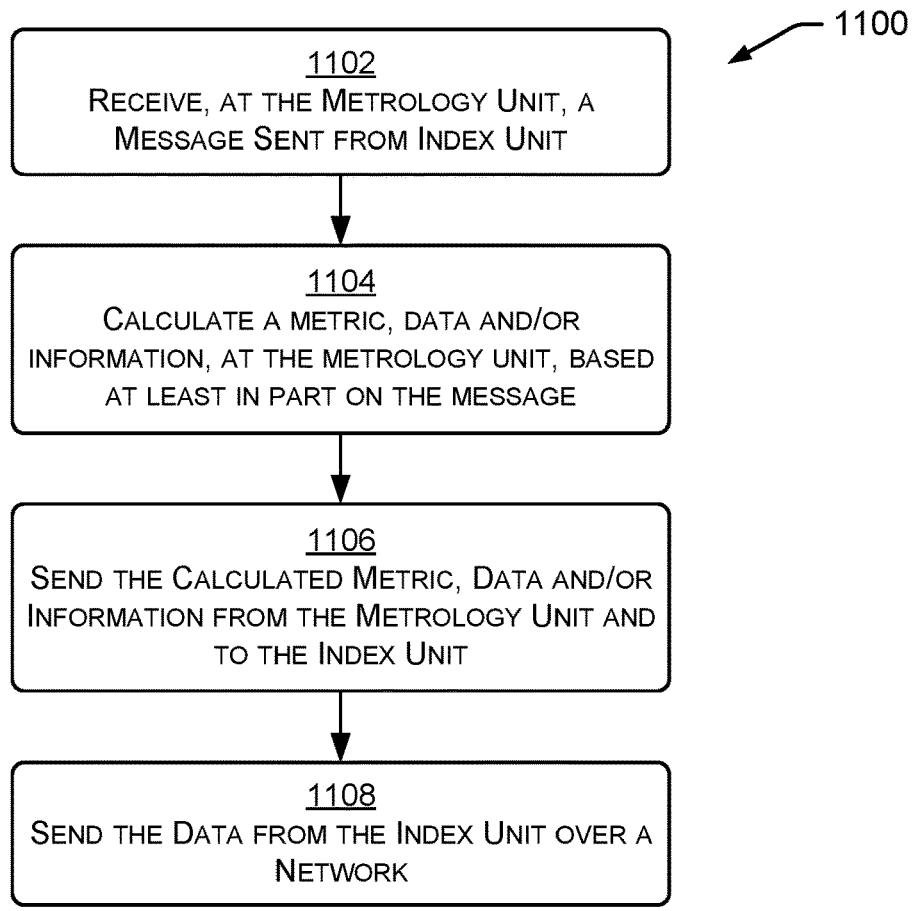
FIG. 11 is a flow diagram showing operation of an example index unit.

FIG. 11 shows example operation 1100 of an index unit, wherein a message is received, at the index unit and from the metrology unit, a metric is calculated at the index unit, and the calculated metric and/or other data is sent over the network. At block 1102, the index unit 106 receives a message from metrology unit 104. At block 1104, the index unit 106 calculates a metric based on the message. In one example, the index unit 106 determines a temperature compensated metric by performing a temperature compensation a volume metric received from the message. At block 1106, the index unit 106 sends information to the network 118 or the reader 114. In one example, the information sent includes the metric calculated on the index unit 106.

Figure 12:
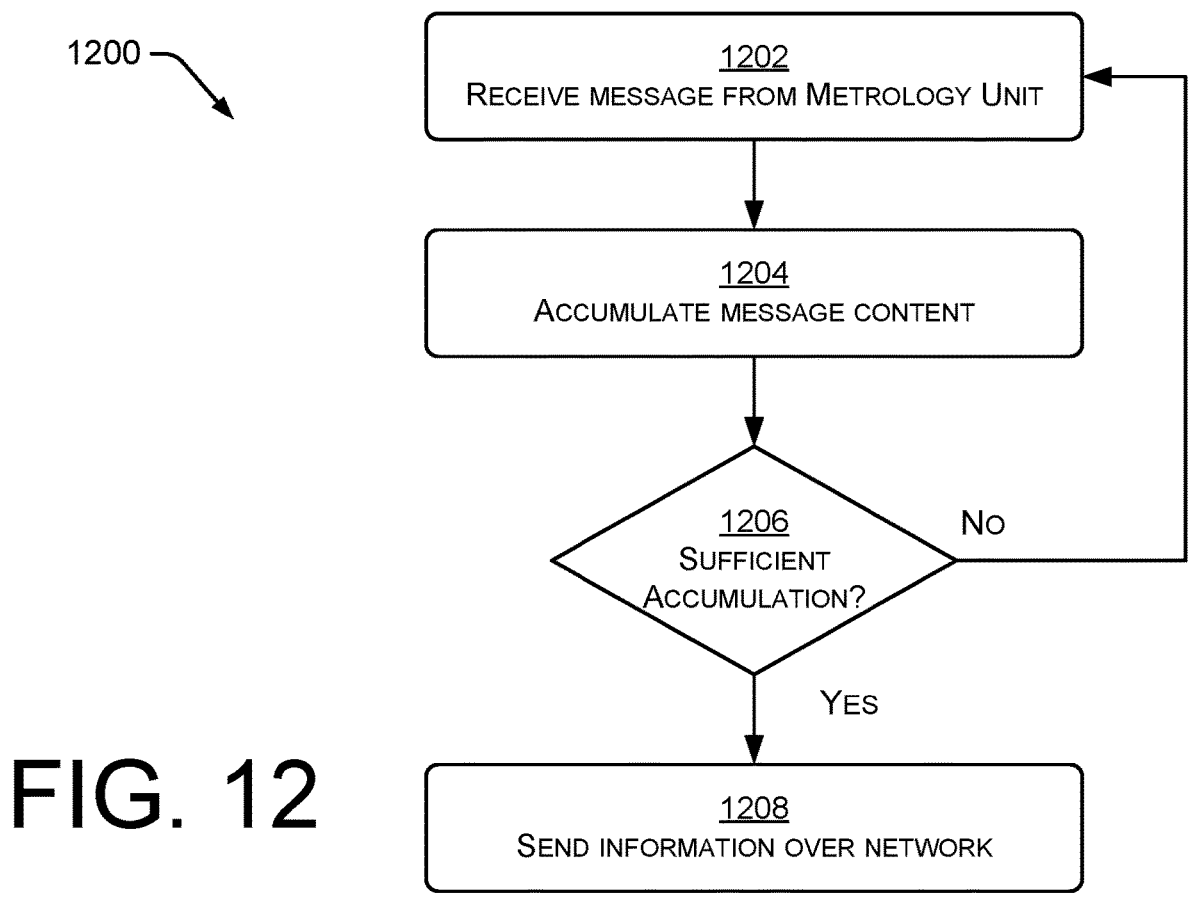
FIG. 12 is a flow diagram showing operation of an example index unit.

FIG. 12 shows example operation 1200 of an index unit 106, wherein a message is received, the message or data from the message is accumulated, and the accumulated information is sent over a network. At block 1202, the index unit 106 receives a message from metrology unit 104. At block 1204, the index unit 106 accumulates the message content. In one example, the processor 216 of the index unit 106 takes the current content from the received message and adds it to an accumulated value in memory 218. In one example, the accumulated message content is volume metrics calculated by the metrology unit 104. In this example, the index unit 106 may receive the volume metrics once per minute but may send the volume information to the utility in hourly consumption units. Thus, the index unit 106 accumulates smaller increments until an hourly accumulation is complete. At decision step 1206, the index unit 106 determines if sufficient accumulation has been recorded. In one example, as described above, the accumulation is based on a usage time unit, such as 15 minutes, an hour, or day. If the accumulation is not complete, the index unit 106 returns to block 1202. If the accumulation is complete, the index unit proceeds to block 1208. At block 1208, the index unit 106 sends accumulated information to the network 118 or the reader 114. In one example, the index unit 106 may also perform a calculation on the accumulated information before sending the accumulated information to the network. In one example this calculation is similar to the calculation performed in block 1104 of FIG. 11.

Figure 13:
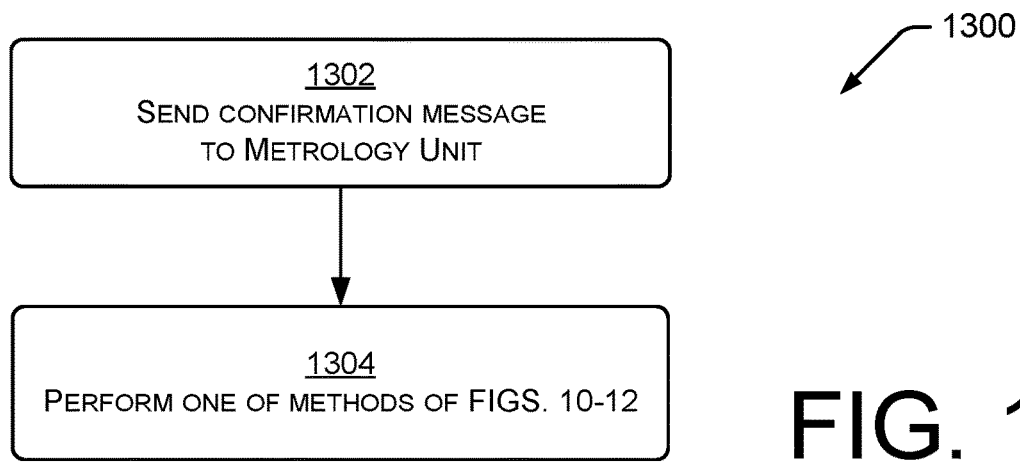
FIG. 13 is a flow diagram showing operation of an example index unit.

FIG. 13 shows example operation 1300 of an index unit, wherein a configuration message is sent to a metrology unit and at least one of a plurality of different actions may be subsequently performed. At block 1302, the index unit 106 sends a configuration message to the metrology unit 104. In one example, the configuration message is sent in combination with an acknowledgement of a previous transmission from the metrology unit 104. In another example, the configuration message contains a mode select indicator instructing the metrology unit 104 to operate in a particular mode. In another example, the possible modes correspond to one or more of the processes described with respect to methods 400 through 900 of FIGS. 4 through 9. In another example, the mode indicator instructs the metrology unit 104 to select between an accumulation mode, such as the processes 600, 700 of FIGS. 6 and 7, and a discrete mode, such as the processes of 800 and 900 of FIGS. 8 and 9. In another example, the configuration message indicates what metrology unit data, if any, should be included in a subsequent message from the metrology unit 104 to the index unit 106. At block 1304, the index unit 106 performs one of the processes 1000 through 1200 described with respect to FIGS. 10 through 12 upon receiving a message from metrology unit 104 responsive to the sending of the configuration message. In another example, the index unit 106 repeats the selected process until a new or different configuration message is sent.

Example Methods

Figure 14:
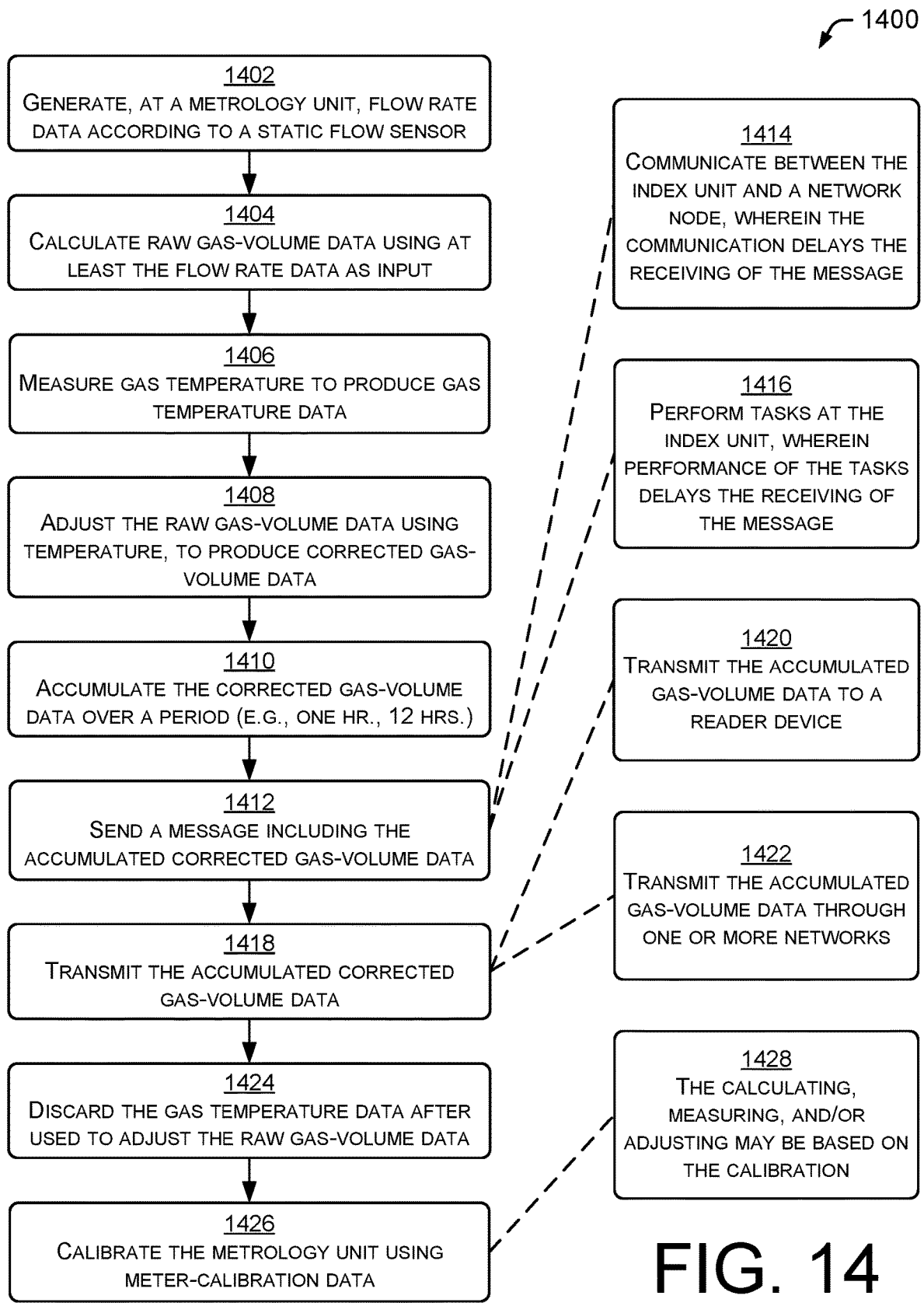
FIG. 14 is a flow diagram showing example operation of a meter including a metrology unit and an index unit.

FIG. 14 shows example operation 1400 of a meter configured to include a metrology unit and an index unit. The metrology unit and the index unit may be configured as a single unit, or as two discrete units communicating over a wired or RF link. At block 1402, in the metrology unit, flow rate data may be generated according to readings from a static flow sensor. The flow rate data may be obtained from a flow rate sensor, such as a pair of ultrasonic transducers, which may be located in the metrology unit of the meter. The flow rate may be sampled frequently, such as every two seconds.

At block 1404, at the metrology unit, the flow rate data are used in calculations to produce raw gas-volume data. By performing the calculations in the metrology unit, the cost in battery power of sending the flow rate data to the index unit is not incurred. Such transmissions are particularly power-intensive, due to both their frequency and time-criticality.

At block 1406, at the metrology unit, gas temperature is measured to produce gas temperature data. The temperature sensor may be a stand-alone sensor, or may be integrated with the flow rate sensor. The measurements may be made at a frequency or timing that is the same or different from the flow rate measurements.

At block 1408, at the metrology unit, the raw gas-volume data is adjusted using the gas temperature data, to produce corrected gas-volume data. By performing the calculation at the metrology unit, there is no battery cost of sending the temperature data to the index unit.

At block 1410, at the metrology unit, the corrected gas-volume data is accumulated, typically for over a minute, or as long as twelve hours or more. Sending flow rate data every two seconds, as is done by known systems, has a substantial battery-power cost. In one example, the accumulation process maintains a running total of the corrected gas-volume data. By accumulating data over a period of one minute, one hour, twelve hours or one day, the cost in battery power of data transmission is greatly reduced over conventional meters and systems.

At block 1412, a message is sent, such as from the metrology unit and to an index unit of the meter. In an example, the message may be pulled by a demand from the index unit, and sent from the metrology unit responsive to the demand. The message may include data associated with the accumulated, temperature-corrected gas-volume data, representing gas flow over the time of accumulation. At block 1414, in a first example of the transmission of the message of block 1412, other communications, such as between the index unit and a network node, may be made. The communication of block 1414 may be, through coincidence or schedule, approximately the same time as transmission of the message of block 1412. Because the message of block 1412 is not time-critical, the communication at block 1414 may delay transmission and receipt of the message sent at block 1412. Due to the flexibility of when the message of block 1412 is sent, slower and more power-efficient hardware devices may be used. At block 1416, in a second example of the transmission of block 1412, the index unit and/or the metrology unit may be involved in the performance of tasks at approximately the time of the transmission of block 1412. However, because the message of block 1412 is not time-critical, the communication at block 1412 may be delayed. The time-flexibility of the sending of the message at block 1412 is based at least in part on the ability of the metrology unit to accumulate data over longer and/or shorter periods of time. This flexibility can result in less expensive hardware, more flexible hardware design, and lower battery power consumption.

At block 1418, the accumulated corrected gas-volume data is transmitted from the index unit and to a utility server. At block 1420, in a first example, the accumulated gas-volume data is transmitted to the utility server by way of a reader device, such as reader device 114 of FIG. 1. At block 1422, in a second example, the accumulated gas-volume data is transmitted to the utility server through one or more networks, such as network 118 of FIG. 1.

At block 1424, gas (or more generally, fluid) temperature data and/or data elements may be discarded and/or overwritten in memory after the data is used, such as in calculations that adjust the raw gas-volume data to obtain corrected gas-volume data at block 1408. This action provides significant savings of battery power and savings of data transmission bandwidth over known systems that transmit temperature data from the metrology unit and to the index unit. By performing calculations that use the temperature data (e.g., conversion of raw gas-volume to corrected gas-volume) in the metrology unit, the index unit does not need the temperature data. In some example embodiments, temperature data may be pulled from the metrology unit by the index unit, and used by the index unit for purposes such as display, tamper evidence, etc.

At block 1426, the metrology unit may be calibrated using meter-calibration data. At block 1428, in one example, the generating of flow rate data at block 1402, the calculating of raw gas-volume data at block 1404, and/or the measuring of gas temperature data at block 1406, or other functionality, is calibrated at the metrology unit.

Figure 15:
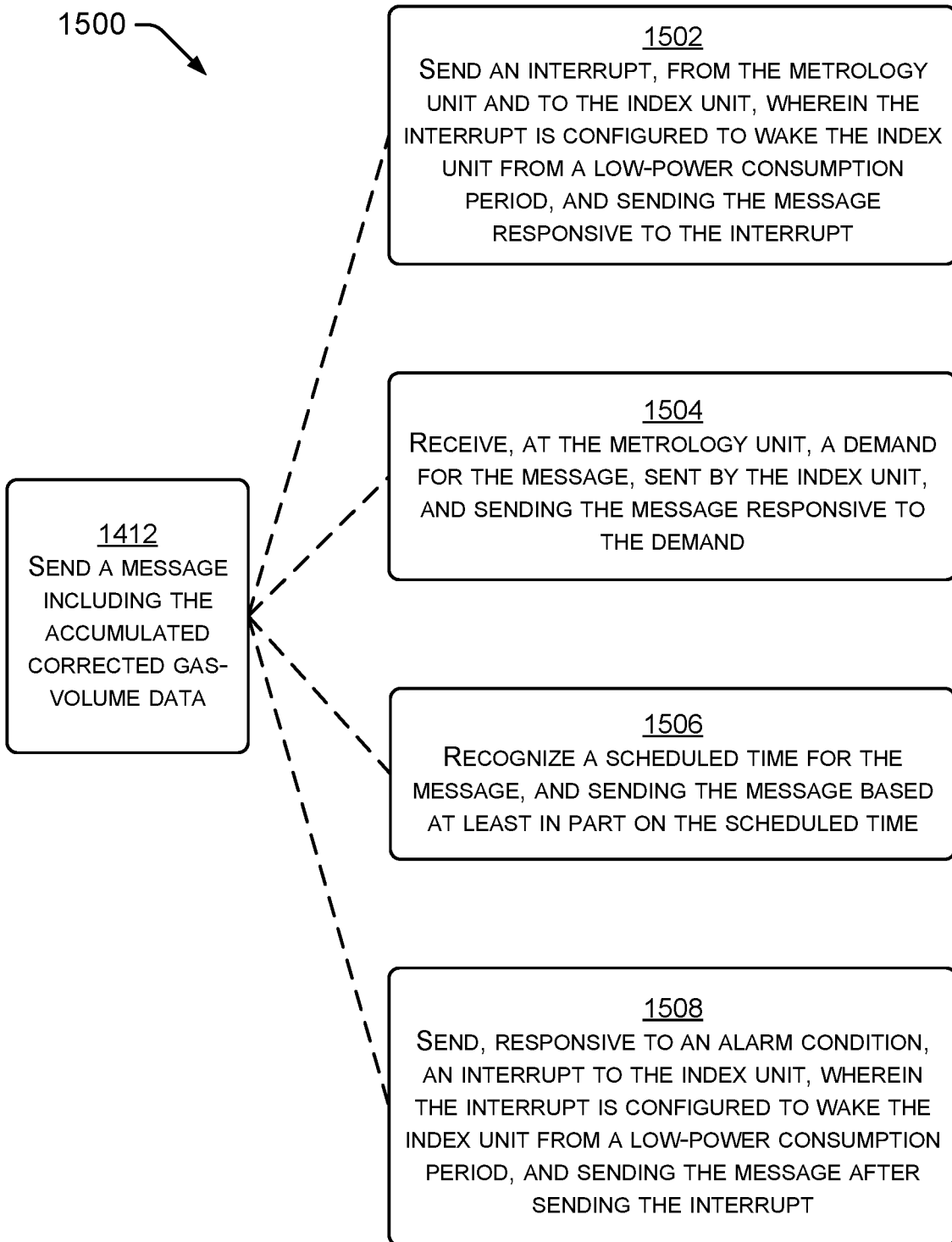
FIG. 15 is a flow diagram showing several example techniques by which a message with data may be sent from the metrology unit to the index unit.

FIG. 15 shows several example techniques 1500 by which a message with data, e.g., accumulated corrected gas-volume data, may be pulled from the metrology unit by a demand sent by the index unit. Accordingly, the blocks of FIG. 15 may be performed in the alternative, or in some instances and/or systems, in combination. The techniques 1500 may be variations of, or examples of, block 1412 of FIG. 14.

At block 1502, in an inspection mode, test mode, an alarm condition, an alarm status, and/or an alarm mode, an interrupt may be sent, from the metrology unit and to the index unit. The interrupt may be configured to wake the index unit from a low-power consumption period, state or mode. The message of block 1412 is then sent, from the metrology unit to the index unit, responsive to the interrupt. Accordingly, the message is sent responsive to an interrupt, sent from the metrology unit and to the index unit, wherein the interrupt is configured to wake the index unit from a low-power consumption period, state or mode. At block 1504, a demand for a message, is sent by the index unit and received at the metrology unit. The message is sent, from the metrology unit and to the index unit, responsive to the demand. Accordingly, the message is sent responsive to a demand for the message, wherein the demand was sent by the index unit. At block 1506, a scheduled time for the message is recognized. The recognition of the schedule may be by both the metrology unit and the index unit. The message is then sent, based at least in part on the scheduled time. Accordingly, the message is sent responsive to a scheduled time for the message. At block 1508, an alarm condition may be present. In an example, the alarm condition could be related to free-flowing gas, which may result from a broken pipe. Responsive to an alarm condition, an interrupt is sent from the metrology unit (which recognized the alarm condition) to the index unit. The interrupt may be configured to wake the index unit from a low-power consumption period, mode or state, if necessary. The message is then sent, following transmission of the interrupt. Accordingly, the message is sent responsive to an alarm condition.

Figure 16:
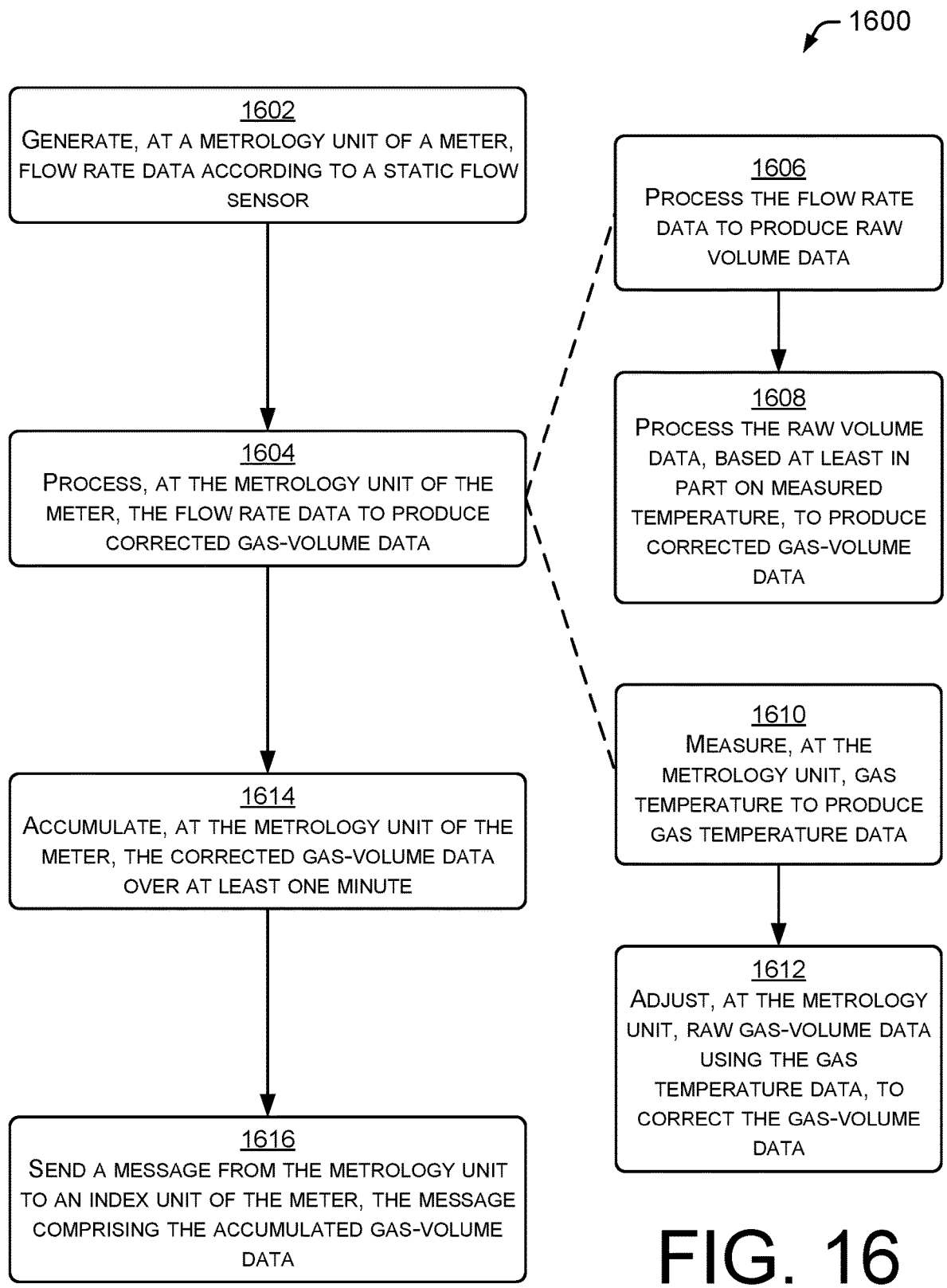
FIG. 16 is a flow diagram showing example techniques by which a metrology unit is operated.

FIG. 16 shows example techniques 1600 by which a metrology unit is operated. At block 1602, flow rate data is generated, at a metrology unit of a meter, according to a static flow sensor.

At block 1604, the flow rate data is processed, at the metrology unit of the meter, to produce gas-volume data processing. At block 1606, in a first example of the processing of block 1604, the flow rate data is processed to produce raw volume data. At block 1608, the raw volume data is processed, based at least in part on measured temperature, to produce the corrected gas-volume data. At block 1610, in a second example of the processing of block 1604, gas temperature is measured, at the metrology unit, to produce gas temperature data. At block 1612, raw gas-volume data is adjusted, at the metrology unit, using the gas temperature data, to produce corrected the gas-volume data.

At block 1614, the gas-volume data is accumulated, at the metrology unit of the meter. In some systems, the data may be accumulated for multiple minutes, hours, or even days before it is pulled from the metrology unit by a demand from the index unit. At block 1616, data is pulled from the metrology unit by a demand or request from an index unit of the meter. The data may include the accumulated gas-volume data.

Figure 17:
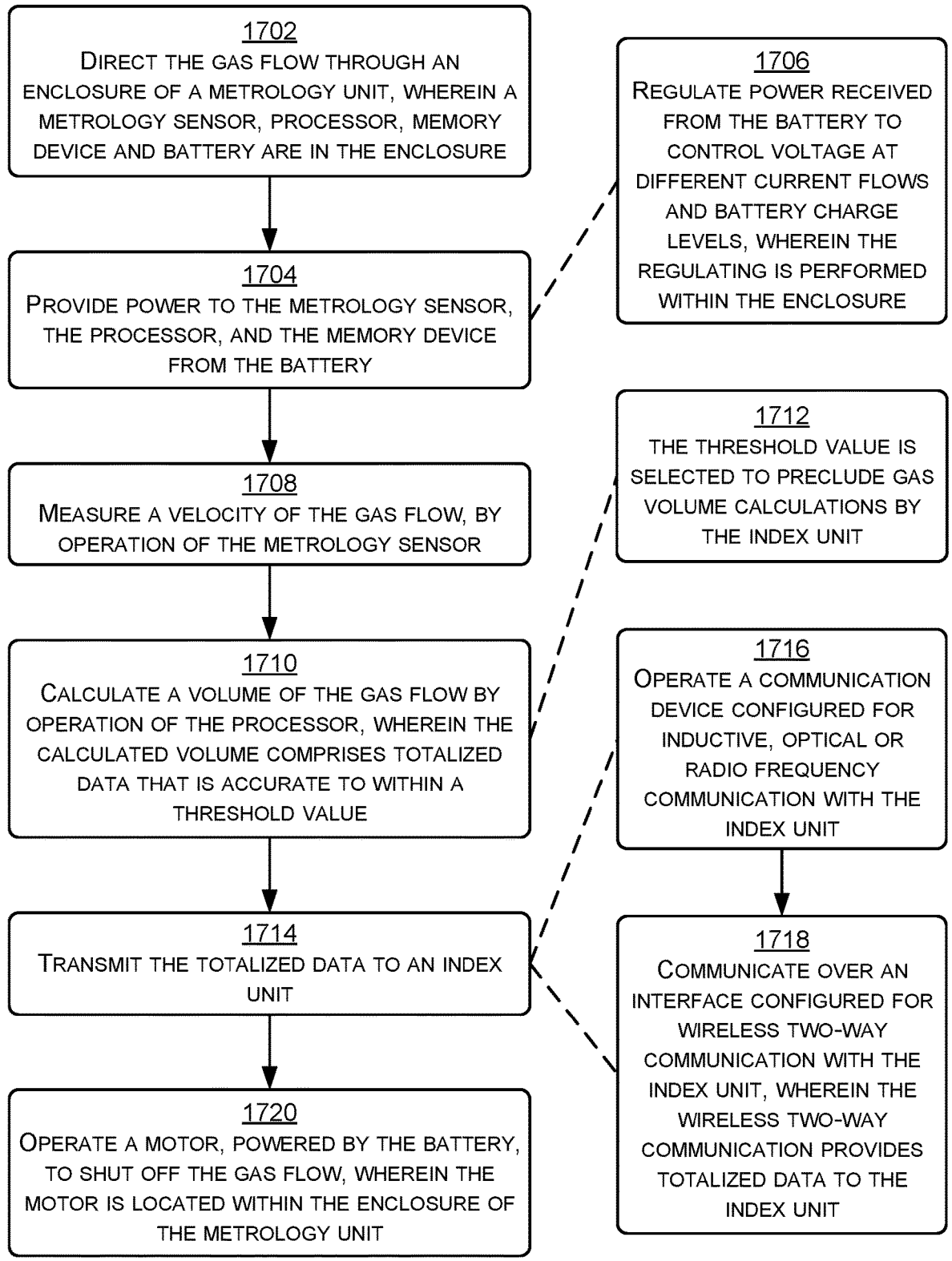
FIG. 17 is a flow diagram showing example techniques by which a metrology unit is operated.

FIG. 17 shows example techniques 1700 by which a metrology unit is operated. In the example shown, the metrology unit may be configured according to the techniques shown, described and associated with FIG. 2B. The utility meter 250 having a metrology unit 104 and an index unit 106 is configured so that the metrology unit is battery powered, and does not depend on the index unit for power or for assistance in measuring gas velocity or for calculating gas consumption to within a legally allowed threshold error value. Accordingly, the index unit 106 may be replaced without having to recertify the newly paired metrology unit and index unit.

At block 1702, the gas flow is directed through an enclosure of a metrology unit, within which a metrology sensor, a processor and a memory device are all powered by a battery within the enclosure. Referring to the example of FIGS. 1 and 2B, the metrology unit 252 includes a metrology sensor 202, a processor 204, a memory device 206, a battery 258 and a power supply 260 that are all within the enclosure 122 (of FIG. 1). At block 1704, power is provided to the metrology sensor, the processor, and the memory device from the battery and/or power supply. Block 1706 shows an example illustrating how power may be provided to components in the metrology unit. In the example, power received from the battery may be regulated to control voltage at different current flows and battery charge levels. FIG. 2B shows that the regulation may be performed within the enclosure of the metrology unit 252 by the power supply 260. At block 1708, a velocity of the gas flow may be measured, such as by operation of a metrology sensor. In the example of FIG. 2B, the metrology sensor 202 measures gas flow velocity. However, alternative technologies and sensors may be used. At block 1710, a volume of the gas flow may be calculated by operation of a processor, such as by using values measured by the sensor(s) as input. The calculated volume be expressed as totalized data that is accurate to within a threshold value. The threshold value may be required by legal, agency or governmental regulations. Block 1712 shows an example illustrating how the threshold value is selected to result in an accurate calculation of totalized gas flow that does not have to be revised or made more accurate by operation of the index unit. In the example of block 1712, the threshold value may selected to preclude, or obviate the need for, gas volume calculations by the index unit. Because of the accurate measurement by the metrology unit, replacement of the index unit 254 does not require recertification of the accuracy of the totalized gas volume calculations of the metrology unit 252. At block 1714, the totalized data is transmitted from the metrology unit to an index unit. Blocks 1716 and 1718 show an example method by which the transmission may be made. At block 1716, a communication device, configured for inductive, optical or radio frequency communication, is used to communicate with the index unit. At block 1718, the communications device allows communication between the metrology unit and the index unit, such as over an interface configured for wireless two-way communication. In the example, the interface allows the metrology unit to send the totalized data to the index unit. In an example use, at block 1720, a motor, powered by the battery and a motor driver, may be operated to close a valve and shut off the gas flow. The battery, motor driver, motor and valve may be located within the enclosure of the metrology unit.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
generating, at a metrology unit of a meter, flow rate data according to readings from a static flow sensor;
calculating, at the metrology unit, raw gas-volume data based at least in part on the flow rate data;
measuring, at the metrology unit, gas temperature to produce gas temperature data;
adjusting, at the metrology unit, the raw gas-volume data, based at least in part on the gas temperature data, to produce corrected gas-volume data;
accumulating, at the metrology unit, the corrected gas-volume data over a predetermined time to create accumulated corrected gas-volume data;
sending, from the metrology unit and to an index unit of the meter, a message comprising the accumulated corrected gas-volume data; and
transmitting, from the index unit and to a utility server, the accumulated corrected gas-volume data.

2. The method of claim 1, wherein sending the message comprises:
sending the message responsive to a demand for the message, wherein the demand was sent by the index unit;
sending the message responsive to a scheduled time for the message; or
sending the message responsive to an alarm condition.

3. The method of claim 1, wherein the transmitting comprises:
transmitting the accumulated gas-volume data to a reader device; or
transmitting the accumulated gas-volume data through one or more networks.

4. The method of claim 1, additionally comprising:
discarding data elements of the gas temperature data after the data elements are used to adjust the raw gas-volume data.

5. The method of claim 1, additionally comprising:
calibrating the metrology unit using meter-calibration data;
wherein one or more of the generating the flow rate data, the calculating the raw gas-volume data, or the adjusting the raw gas-volume data to produce the corrected gas-volume data, is based at least in part on the calibrating.

6. A method, comprising:
generating, at a metrology unit of a meter, flow rate data according to a static flow sensor;
measuring, at a temperature sensor, gas temperature to produce gas temperature data;
processing, at the metrology unit of the meter, the flow rate data to produce gas-volume data, wherein the processing comprises adjusting, at the metrology unit, raw gas-volume data using the gas temperature data, to produce the gas-volume data;
accumulating, at the metrology unit of the meter, the gas-volume data to thereby create accumulated gas-volume data; and
sending the accumulated gas-volume data from the metrology unit to an index unit of the meter.

7. The method of claim 6, wherein sending the accumulated gas-volume data comprises:
sending, by the metrology unit, an interrupt to the index unit, wherein the interrupt is configured to wake the index unit from a low-power consumption state; and
sending the accumulated gas-volume data.

8. The method of claim 6, wherein sending the accumulated gas-volume data comprises:
receiving, at the metrology unit, a demand from the index unit; and
sending the accumulated gas-volume data responsive to the demand.

9. The method of claim 6, wherein sending the accumulated gas-volume data comprises:
recognizing a scheduled time for sending the accumulated gas-volume data; and
sending the accumulated gas-volume data, from the metrology unit, based at least in part on the scheduled time.

10. The method of claim 6, wherein sending the accumulated gas-volume data comprises:
recognizing an alarm condition;
sending an interrupt to the index unit, wherein the interrupt is configured to wake the index unit from a low power-consumption state; and
sending the accumulated gas-volume data after sending the interrupt.

11. The method of claim 6, additionally comprising:
discarding the gas temperature data after the gas temperature data is used.

12. The method of claim 6, additionally comprising:
calibrating the metrology unit using meter-calibration data;
wherein one or more of the generating or processing is based at least in part on the calibrating.

13. The method of claim 6, additionally comprising:
receiving a command to change content of the accumulated gas-volume data; and
changing, responsive to the command, content of the accumulated gas-volume data.

14. The method of claim 6, wherein the method is performed at least in part by the metrology unit, and wherein the metrology unit is located at least in part within a gas flow.

15. The method as recited in claim 6, additionally comprising:
transmitting the accumulated gas-volume data to a reader device; or
transmitting the accumulated gas-volume data through one or more networks.

16. The method of claim 6, wherein sending the accumulated gas-volume data comprises:
sending the accumulated gas-volume data responsive to a demand sent by the index unit;
sending the accumulated gas-volume data responsive to arrival of a scheduled time; or
sending the accumulated gas-volume data responsive to an alarm condition.

17. A metrology unit of a meter, comprising:
a gas-flow sensor;
a processor in communication with the gas-flow sensor, wherein the processor is configured for:
generating flow rate data according to the gas-flow sensor;
processing the flow rate data to produce raw gas-volume data;
adjusting the raw gas-volume data, based at least in part on measured temperature data, to produce corrected gas-volume data;
accumulating the corrected gas-volume data over a period of at least one hour to create accumulated corrected gas-volume data; and
sending a message to an index unit of the meter, the message comprising the accumulated corrected gas-volume data; and
an interface to the index unit, in communication with the processor, for communication and power transmission.

18. The metrology unit of claim 17, wherein the interface receives power for operating the gas-flow sensor and for data processing on the metrology unit, wherein the processing comprises the adjusting the raw gas-volume data to produce the corrected gas-volume data and the accumulating the corrected gas-volume data.

19. The metrology unit as recited in claim 17, additionally comprising:
a memory device, connected to the processor, and configured to store data representing at least 12 hours of gas consumption.

20. The metrology unit as recited in claim 17, additionally comprising:
a temperature sensor to provide the measured temperature data.

* * * * *